United States Patent

Shichman

[11] 4,120,339
[45] Oct. 17, 1978

[54] PNEUMATIC TIRE HAVING CARCASS CORDS WHICH DEPART FROM THE RADIAL PLANE IN THE TREAD REGION

[75] Inventor: Daniel Shichman, Trumbull, Conn.

[73] Assignee: Uniroyal, Inc., New York, N.Y.

[21] Appl. No.: 809,594

[22] Filed: Jun. 24, 1977

Related U.S. Application Data

[63] Continuation of Ser. No. 648,617, Jan. 12, 1976, abandoned.

[51] Int. Cl.² .............................................. B60C 9/10
[52] U.S. Cl. ........................... 152/354 RB; 152/361 R
[58] Field of Search ........... 152/354, 361 R, 361 DM, 152/356

[56] References Cited

U.S. PATENT DOCUMENTS

| | | | |
|---|---|---|---|
| 2,884,040 | 4/1959 | Boussu et al. | 152/356 |
| 3,327,753 | 6/1967 | Travers | 152/356 |
| 3,789,900 | 2/1974 | Verdier | 152/356 |
| 3,814,162 | 6/1974 | Hashida et al. | 152/356 X |
| 3,850,219 | 11/1974 | Snyder | 152/361 DM |
| 3,896,869 | 7/1975 | Fujishima et al. | 152/361 DM |

Primary Examiner—Allen N. Knowles
Assistant Examiner—Fred A. Silverberg
Attorney, Agent, or Firm—Charles A. Blank

[57] ABSTRACT

A pneumatic tire of a modified radial type. The tire has carcass cords which depart from the radial plane in the tread region and has at least one breaker ply continuously extending from shoulder to shoulder and having a cord angle averaged over a region extending a substantial distance on each side of the equator of the tire in the range of 12° to less than 20° with respect to the equator. The tire has long tread life and low power consumption.

13 Claims, 9 Drawing Figures

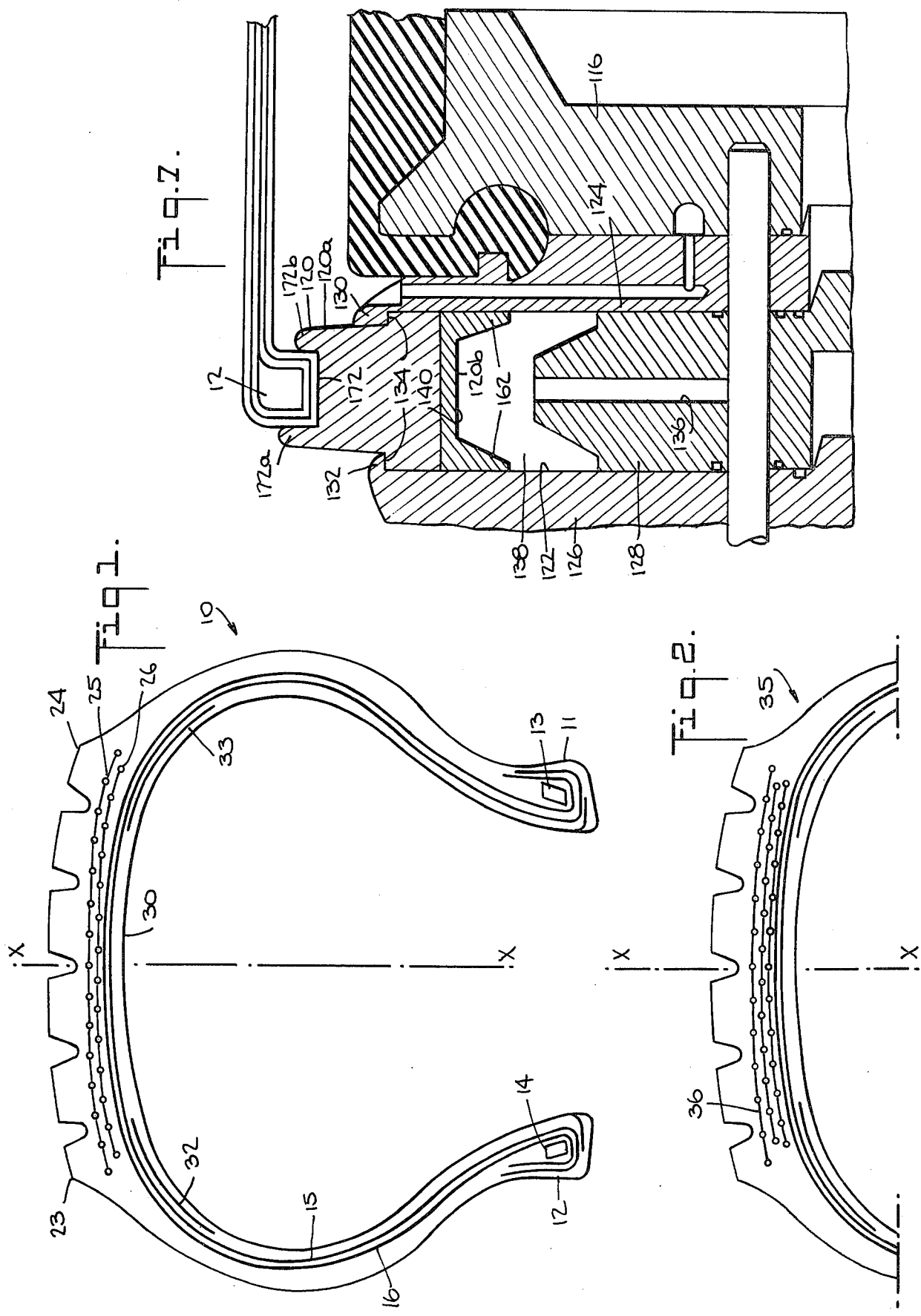

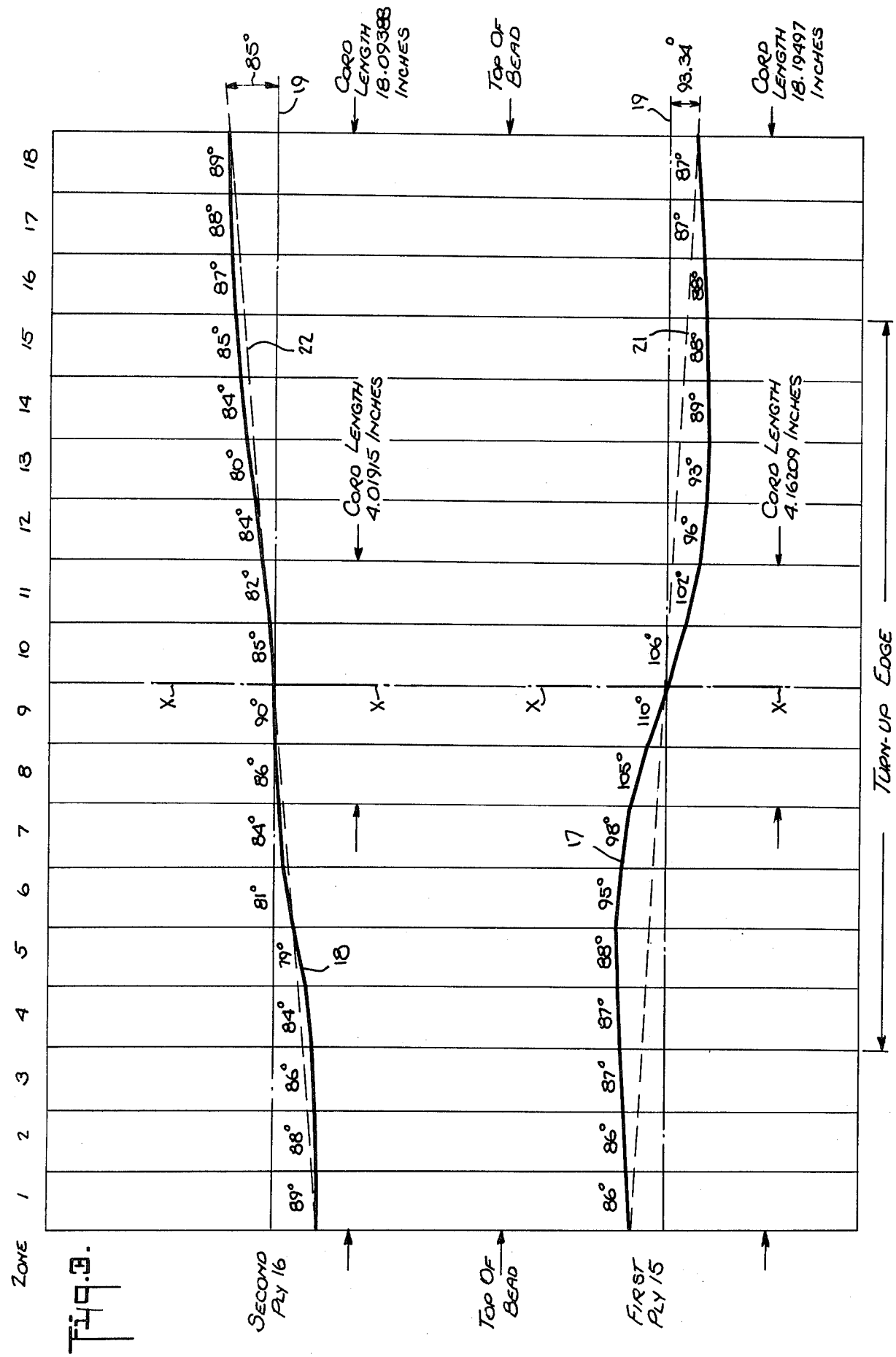

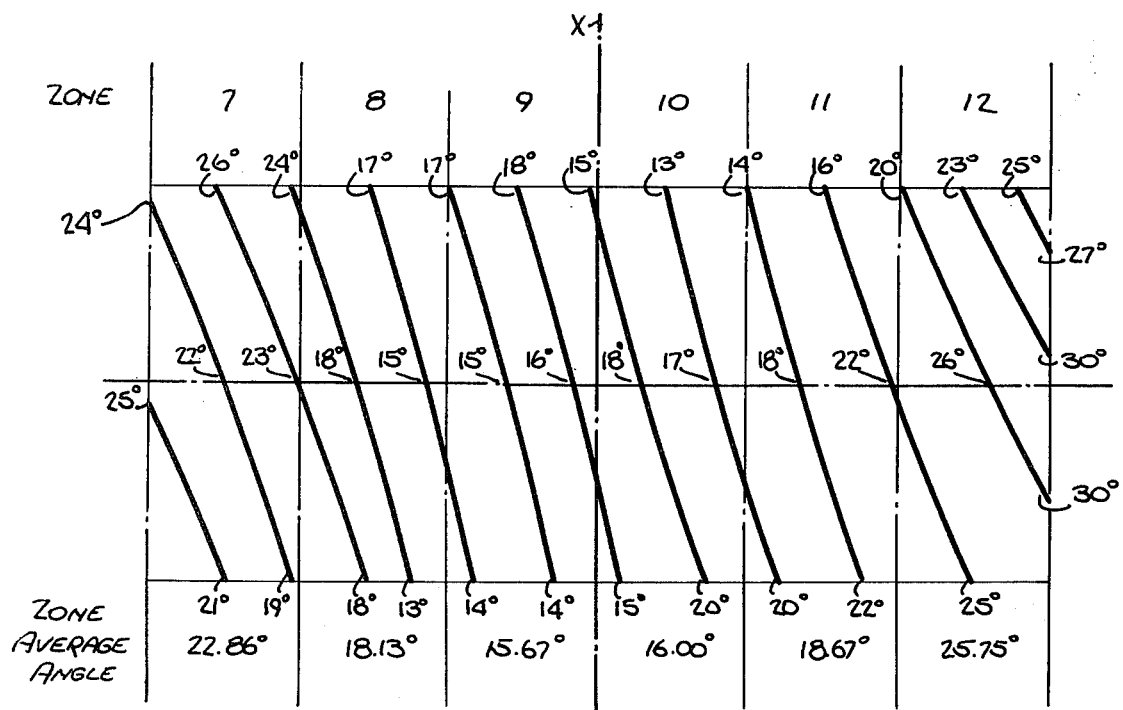
Fig. 4. Breaker Ply 25
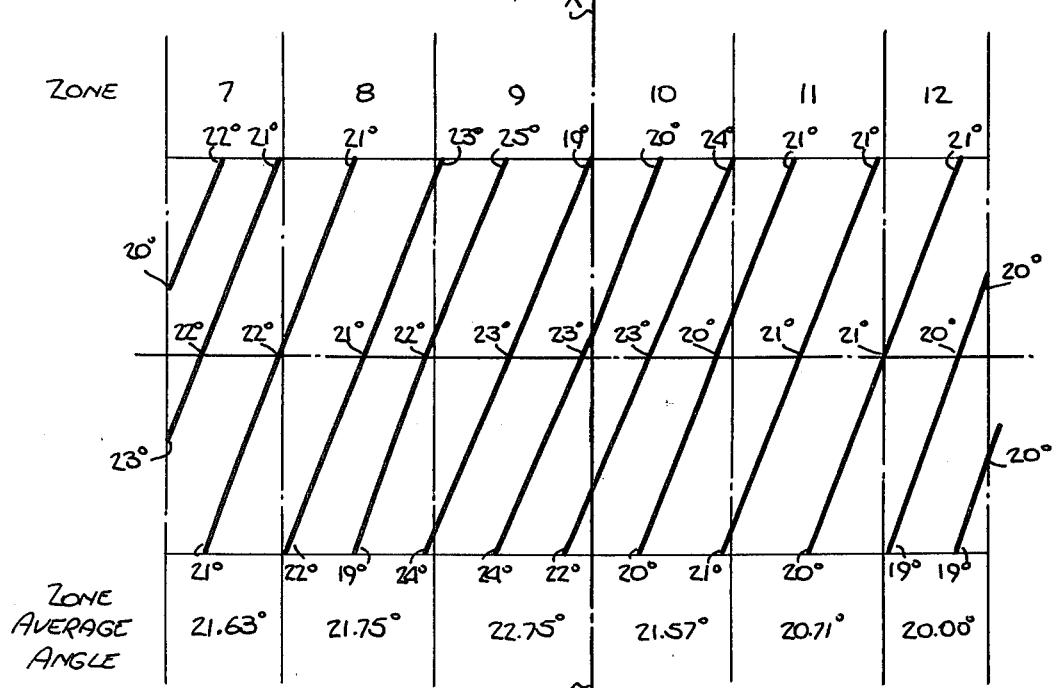
Fig. 5. Breaker Ply 26

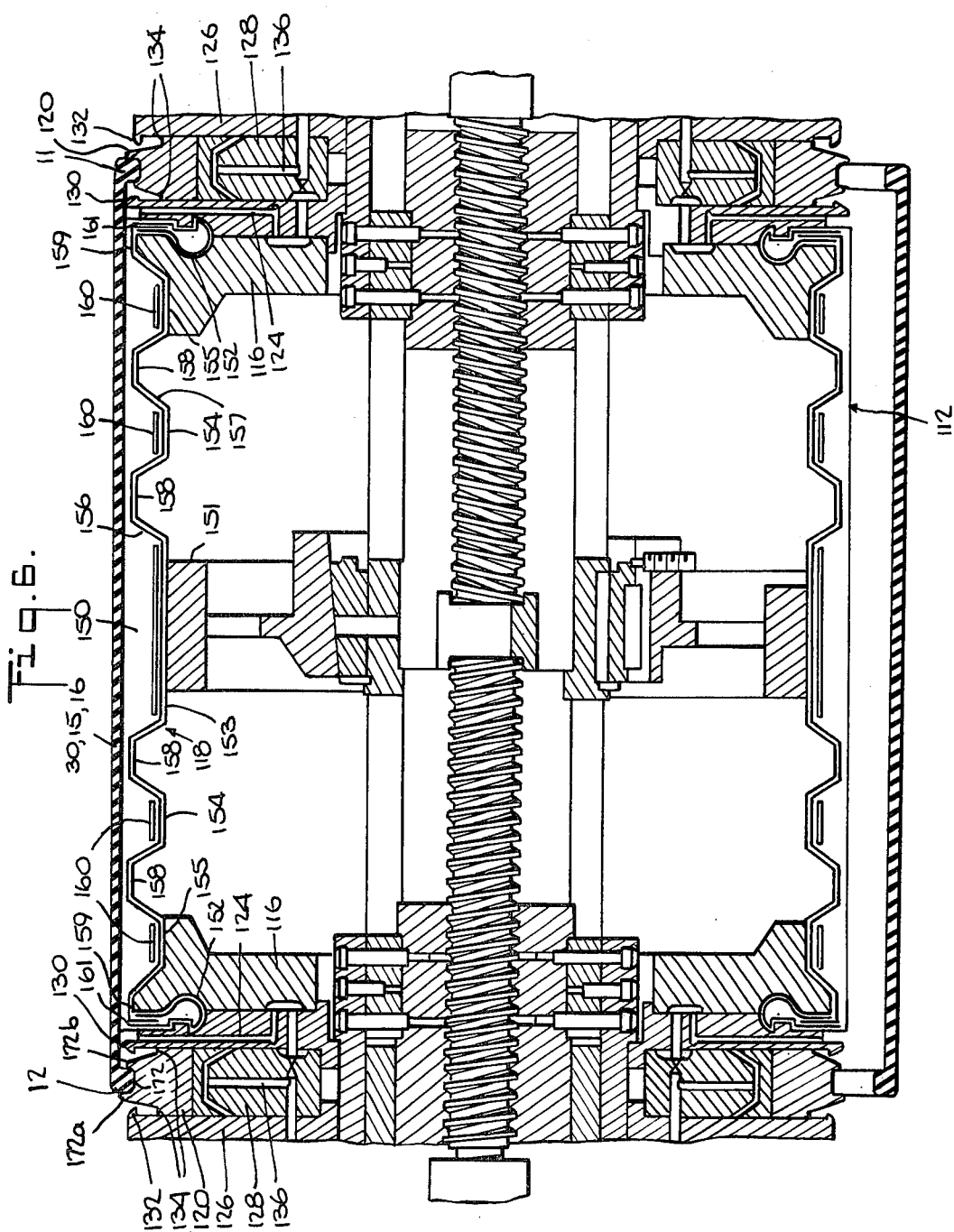

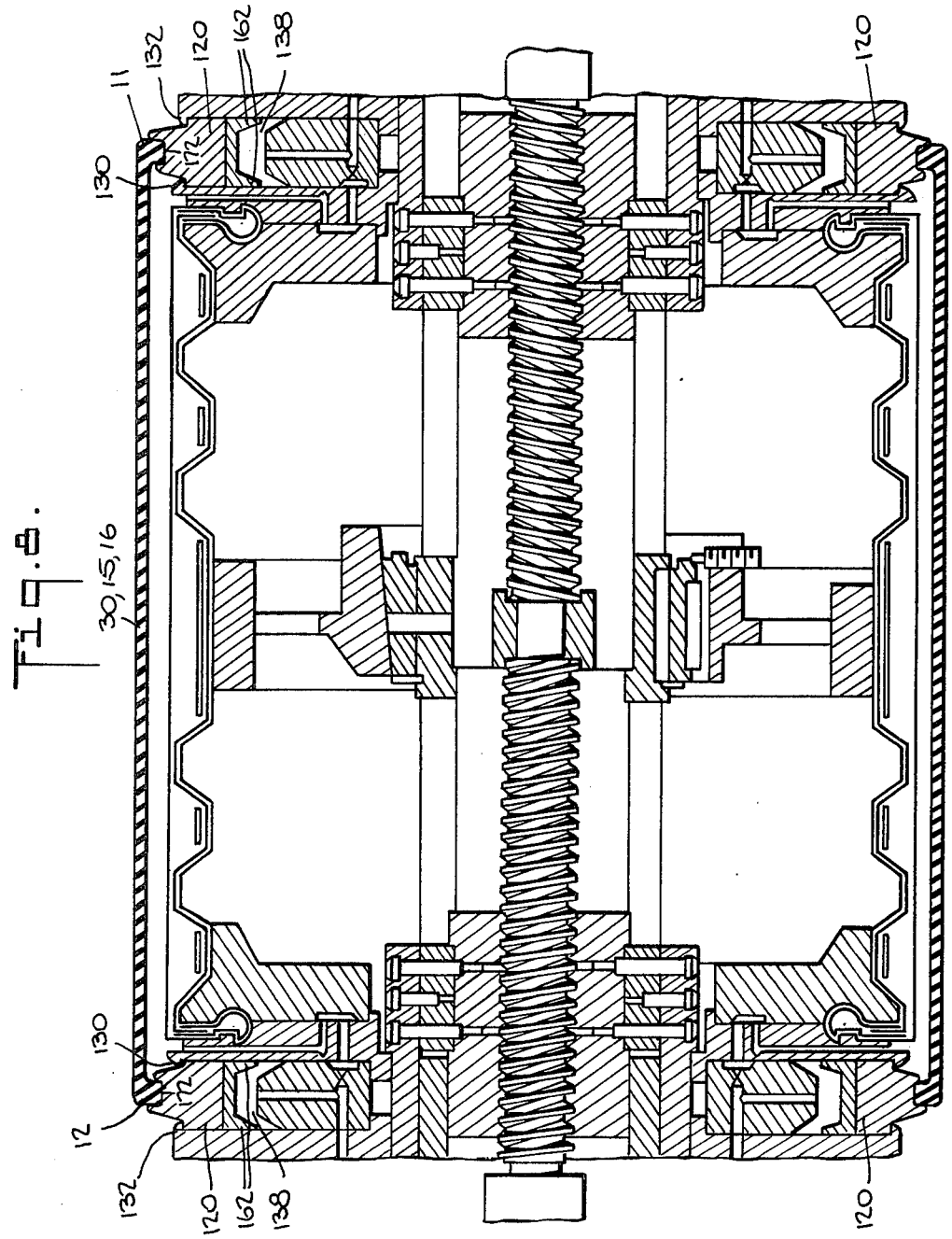

PNEUMATIC TIRE HAVING CARCASS CORDS WHICH DEPART FROM THE RADIAL PLANE IN THE TREAD REGION

This is a continuation, of application Ser. No. 648,617, filed Jan. 12, 1976 now abandoned.

This invention relates to pneumatic tires and to methods of making the same and, more particularly, to modified radial tires and to methods of making the same.

As used herein, the term "cords" is intended to include threads, filaments, yarns, wires, cables, bands, braids and the like.

One type of modified radial tire of the prior art is described in U.S. Pat. No. 3,327,753-Travers.

Travers states an improvement in road-holding ability, resistance to rolling and fuel consumption by eliminating one tread ply in a tire having radially extending cords in its sidewalls and obliquely extending cords under the tread. In the Travers tire there is a circumferential displacement of the beads during manufacture, with a resulting circumferential displacement of the cords at the beads. Circumferential displacement of the cords at the beads over 5° can cause non-uniformities or require specialized equipment.

A tire in accordance with my invention has no circumferential displacement of the beads during manufacture with no circumferential displacement of the cords at the beads. Moreover, a tire in accordance with my invention has a breaker cord angle averaged over a distance on each side of the mid-circumferential line or equator of the tire in the range of twelve to less than 20°. A tire in accordance with my invention has a higher breaker cord angle averaged over a substantial distance at the edges of the breaker. High circumferential stiffness of the tread or crown region is provided by a breaker having a cord angle at the equator of less than 20°, with the stiffness increasing as the cord angle decreases. High circumferential stiffness of the crown aids in providing long tread life (low tread wear) and low power consumption. On the other hand, low breaker cord angles cause high rubber strains at the edges of the breaker, limiting the endurance of the breaker. Thus, by providing a low breaker cord angle of less than 20° at the equator and a higher breaker cord angle at the breaker edges, the tread wear and endurance of the tire is improved.

It is an object of the invention to provide a new and improved pneumatic tire which avoids one or more of the above-mentioned disadvantages of prior such tires.

It is another object of the invention to provide a new and improved pneumatic tire which has long tread life.

It is another object of the invention to provide a new and improved pneumatic tire which has lower power consumption.

It is another object of the invention to provide a new and improved method of manufacturing a pneumatic tire of a modified radial type which requires low capital investment in shaping and vulcanizing equipment.

In accordance with the invention, a pneumatic tire having tread, shoulder and sidewall regions comprises a carcass comprising two beads and at least one ply of cords extending from bead to bead, the shortest line along the carcass from the end region of a given cord of the ply at one bead to the end region of the given cord at the other bead being a line lying in a plane in the range of 0° to 5° from a radial plane of the tire. The end regions of the given cord at both beads are substantially equally spaced from the radial plane. The carcass cords depart from the shortest lines along the carcass between the end regions of the cords at the aforesaid one bead to the end regions of the cords at the aforesaid other bead. At least one breaker ply of cords extends continuously over the carcass plies from shoulder region to shoulder region of the tire and has two circumferential edges and has a cord angle averaged over a region extending a substantial distance on each side of the equator of the tire in the range of 12° to less than 20° with respect to the equator and has a cord angle averaged over a substantial distance at the edges of the breaker ply which is higher than the average breaker cord angle on each side of the equator. The tire also includes tread and sidewall portions of elastomeric material over the carcass and breaker ply.

Also in accordance with the invention, the method of making a pneumatic tire and molding the tire in a tire mold comprises forming a tire carcass of approximately cylindrical shape having at least one ply of tire cord fabric extending between a pair of beads with the cords of the fabric being substantially parallel to the axis of the cylindrical carcass. The method includes the steps of gripping both beads of the carcass and partially expanding the carcass to a maximum diameter increased over the diameter of the cylindrical carcass by an amount not greater than 85 percent of the difference between the maximum diameter of the carcass when fully expanded into the mold and the diameter of the cylindrical carcass. The method also includes applying at least one breaker ply of cords around the region of maximum diameter of the partially expanded carcass, applying a tread portion of elastomeric material over the carcass and breaker ply, placing the assembled carcass, breaker ply and tread portion in a press having the tire mold therein, fully expanding the assembled carcass breaker ply and tread portion into the tire mold to form a tire, and curing the tire.

For a better understanding of the present invention, together with other and further objects thereof, reference is made to the following description, taken in connection with the accompanying drawings, and its scope will be pointed out in the appended claims.

Referring now to the drawings:

FIG. 1 is a cross sectional view, partly schematic of a pneumatic tire constructed in accordance with the invention;

FIG. 2 is a fragmentary cross sectional view, partly schematic, of another tire constructed in accordance with the invention;

FIG. 3 is a diagram representing the cord lay of the FIG. 1 tire in the two bead to bead carcass plies thereof;

FIG. 4 is a diagram representing the cord lay of the outer breaker of the FIG. 1 tire;

FIG. 5 is a diagram representing the cord lay of the inner breaker of the FIG. 1 tire;

FIG. 6 is a sectional view of apparatus useful in practicing the method of the present invention;

FIG. 7 is an enlarged fragmentary view of the FIG. 6 apparatus;

FIG. 8 is a view of the FIG. 6 apparatus at another step of the method of the present invention.

Figure 9:
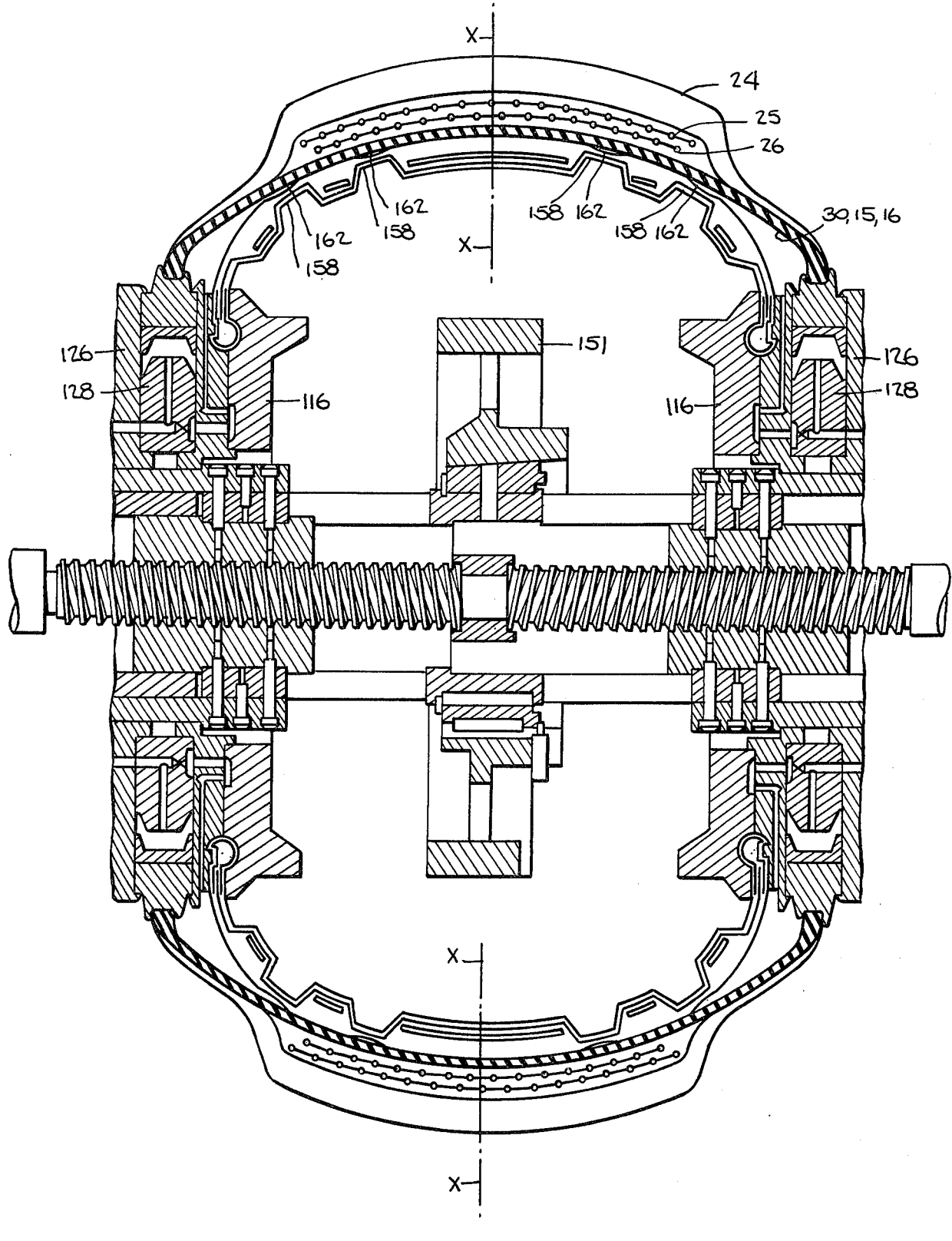
FIG. 9 is a view of the FIG. 6 apparatus at another step of the method of the present invention.

Referring now more particularly to FIG. 1 of the drawings, there is represented a pneumatic tire 10 having tread, shoulder and sidewall regions comprising a carcass comprising two beads 11,12 having bead wires 13,14 and at least one ply of cords 15, and preferably a second ply 16, extending from bead to bead. The plies 15,16 may, for example, have polyester cords. Referring to FIG. 3 of the drawings, there is represented diagrammatically a representative cord 17,18 of the first and second plies extending from bead to bead with the radial direction represented by lines 19 in broken-line construction at 90° and with the angle of one-inch segments of the cords 17,18 being as designated on the drawing in one-inch zones 1–18, inclsive.

The shortest line along the carcass from the end region of a given cord of each ply at one bead to the end region of the given cord at the other bead is represented by lines 21,22 in broken line construction. The line 21 lies in a first plane in the range of 2° to 5° from a radial plane of the tire and the line 22 lies in a second plane in the range of 2° to 5° from the radial plane of the tire and intersects the first plane approximately at the equator or mid-circumferential line X—X of the tire. The end regions of the given cords 17,18 are substantially equally spaced from the radial plane, that is, the end regions of each given cord are within 3° of equal spacing from the radial plane. The spacing of the cord 17 from the radial plane represented by line 19 at both bead regions is, for example, 3.34°, and the spacing from the radial plane of the cord 18 at both beads is, for example 5°.

The carcass cords 17,18 depart from the shortest lines 21,22 along the carcass between the end regions of the cords at one bead to the end regions of the cords at the other beads. The maximum departure of the cords of at least one ply, for example, the inner ply 15, from the shortest lines, such as line 21, along the carcass between the end regions of the cords of the aforesaid one ply 15 lies in the range of 10° to 30° averaged over a substantial length, for example, one inch, of the cords of the aforesaid one ply. For example, in zone 9 the cord 17 has a maximum departure from the line 21 of 16.66° averaged over a one inch segment.

Referring again to FIG. 1, the tire 10 has at least one breaker ply 25 of cords extending continuously over the ply 25 with the average cord angle for each of one-inch zones 7–12 being indicated. The average angle for each zone was obtained by measuring the entrance, exit, and center angles for each cord for the ply section shown and averaging all those occurring on or within the appropriate one-inch zone boundaries. The breaker ply 25 has a cord angle averaged over a region extending a substantial distance, for example, one inch on each side of the equator X—X in the range of 12° to less than 20°, for example, 15.67° and 16.00° with respect to the equator X—X. The average breaker cord angle at the circumferential edges of the breaker is in the range of 16° to 32° with respect to the equator X—X. For example, the average breaker cord angles of breaker ply 25 in zones 7 and 12 are 22.86° and 25.75°.

FIG. 5 represents the paths of typical cords of a section of the inner breaker ply 26 with the cord angles at selected points and the average cord angle in zones 7–12 being indicated. The breaker ply 26 is, for example, one-quarter inch narrower in zone 7 and one-quarter inch narrower in zone 12 than the breaker ply 25.

Due to the curvature of the cords such as cord 17 of the inner carcass ply 15, the carcass ply 15 is "tighter", that is, under greater extensive stress during cure, both under the breakers in zones 7–12 and in the sidewall zones 1–6 and 13–18 than the carcass ply 16.

There may be a tendency in some constructions for the liner 30 (FIG. 1) to be distorted into the carcass ply 15, with the distortion known as "strainthrough" of the liner into the carcass. To minimize such distortion, a strip 32,33 of rubber having a width of, for example, four inches preferably is placed at each shoulder. The strips 32,33 are compounded to be compatible in adhesion with the carcass.

The tire 10 also includes tread and sidewall portions of elastomeric material, which may be natural or synthetic or a combination of both, over the carcass and breaker plies.

The components of the tire 10 preferably have the characteristics indicated in Table 1:

TABLE 1

|  | Liner 30 | Strips 32,33 | Carcass Plies 15,16 | Breakers 25,26 | Tread | Sidewall |
|---|---|---|---|---|---|---|
| % Natural Elastomer | 11.03 | 26.53 | 29.97 | 26.53 | 0 | 27.54 |
| % Synthetic Elastomer | 44.12 | 26.53 | 29.98 | 26.53 | 45.09 | 27.55 |
| % Filler | 33.09 | 26.53 | 23.98 | 26.53 | 31.57 | 27.55 |
| MS at 270° F 3 point rise time (Min.) (Mooney scorch) | 8–10 | 10–12 | 8–10 | 10–12 | 14–20 | 8–10 |
| ML 1+4 at 212° F (Mooney viscosity) | 40 | 35 | 45 | 35 | 65 | 45–50 |
| Minutes cured at 45 psi steam | 30 | 30 | 30 | 30 | 30 | 30 |
| Tensile strength at room temperature (psi) | 1100 | 2600 | 2000 | 2600 | 2500 | 2500 |
| Elongation at room temperature (%) | 550 | 500 | 425 | 500 | 550 | 600 |
| 300% Modulus of elasticity (psi) | 500 | 1600 | 1200–1400 | 1600–1800 | 1200 | 1000 |
| Tear Strength ($\frac{\text{lbs pull}}{\text{inch thickness}}$) (Die C test) | 153 | 300 | 290 | 300 | 280 | 290 |
| Shore A hardness | 46 | 60 | 55–58 | 62 | 55–60 | 50 |
| Strip Adhesion at 250° F (lbs./inch) |  |  | 35–50 | 50–65 |  |  | carcass plies from shoulder region 23 to shoulder region 24. The breaker ply 25 has two circumferential edges and has a cord angle averaged over a region extending a substantial distance on each side of the equator X—X of the tire in the range of 12° to less than 20° and having a cord angle averaged over a substantial distance at the edges of the breaker ply which is higher than the average breaker cord angle on each side of the equator. The FIG. 1 tire also includes an inner breaker ply 26. The breaker plies 25,26 may, for example, have glass cords.

FIG. 4 represents the cord paths as shown by a sampling of representative cords of a section of the breaker Referring now to FIG. 2, a tire constructed in accordance with the invention may be generally similar to the FIG. 1 tire but may also include a cap ply 36. The tire may, for example, comprise two breaker plies of rubber-coated glass cords and a cap ply breaker of rubber-coated nylon cords.

Referring now more particularly to FIGS. 6 and 7, apparatus useful in making the FIG. 1 tire is there represented.

The FIG. 6 apparatus comprises a building drum generally designated 112 comprising a pair of co-axial, cylindrical end plates 116. A flexible, inflatable cylindrical diaphragm 118, to be described subsequently, is attached at its ends to the end plates 116, one end to each end plate. A pair of coaxial, annular, elastomeric bead gripping rings 120 are shown, in FIG. 6, in a retracted position in a pair of circumferential channels 122, each of which is defined by side members 124 and 126 and a bottom section 128. Side members 124 and 126 have respectively retaining and pressure sealing lips 130 and 132 for engaging the shoulders 134 of the bead gripping rings 120 and controlling the extent of their outward travel in an expanded position, as shown in FIG. 7. Thus, the engagement of the sealing lips 130 and 132 with the shoulders 134 provides improved centering of the tire bead with respect to the axis of the drum 12. The bottom section 128 of each of the channels 122 has an air inlet passage 136 for admitting high pressure air into the cavity 138 formed by the interior surface 140 (see FIG. 7) of the ring 120 and the bottom portion 128 and side members 124 and 126 of the channel 122.

Referring now to FIGS. 6, 7, and 8, a pair of beads 11,12 of an uncured tire carcass are shown held in position by a continuous, circumferential slot formed by the circumferential surface 172 and shoulders 172a and 172b adjacent thereto of each of the expanded rings 120. The rings 120 are moved to their expanded position in the channels 122 by admission of high pressure air into the cavities 138. Escape of air from the cavities 138 is prevented by pairs of pressure sealing flaps 162 extending inwardly from beneath both shoulders 134 of the ring 120 which provide increased air sealing as pressure of the air in the cavities 138 increases and, as a back-up, by the sealing lips 130 and 132.

As best seen in FIG. 7, the bead grip ring 120 is divided into outer and inner segments, the outer segment being indicated by 120a and the inner segment comprising the pressure sealing flaps 162, so that the ring 120 has outer segment 120a and inner segment 120b. The outer segments designated "a" comprise a harder rubber for contact with the tire which preferably has a reading on a Shore A durometer between about 75 and 80, while the inner segments "b" comprise a softer rubber for sealing against the side members 124 and 126 and preferably has a reading of between about 60 and 65 on a Shore A durometer. Preferred rubbers for the "a" and "b" segments have the following compositions:

| Material | Parts by Weight |
|---|---|
| "a" segment | |
| Neoprene GRT | 87.5 |
| Neoprene FB | 12.5 |
| Carbon Black | 60 |
| Neozone A | 2 |
| Stearic Acid | 0.5 |
| Magnesium Oxide | 7 |
| 2,2'-Benzothiazyl disulfide | 0.5 |
| Polymel #7 | 8 |
| Zinc Oxide | 2.5 |
| "b" segment | |
| Neoprene GRT | 100 |
| Carbon black | 50 |
| Neozone A (N-phenyl-alpha-naphthylamine) | 1 |
| Magnesium Oxide | 5 |
| Aromatic Resin | 5.3 |
| Aromatic hydro-carbon oil | 20 |
| Zinc Oxide | 4 |

Neoprene GRT is a polymer of 2-chlorobutadiene 1,3 manufactured by duPont Company.

Neoprene FB is a low molecular weight polymer of 2-chlorobutadiene 1,3 manufactured by duPont Company and functions as a plasticizer.

Neozone A is N-phenyl-alpha-napthylamine manufactured by duPont Company and functions as an antioxidant.

Polymel #7 is low molecular weight polyethylene having a specific gravity of 0.93 manufactured by Polymel Corporation. Its presence in the compound provides for improved mold release after cure.

The aromatic hydrocarbon oil used in the "b" segment is Sundex 790, manufactured by Sun Oil Company, which has a specific gravity of 0.9806, a flash point of 435° F. and an aniline point of 116° F.

The aromatic resin is Picco AP25 Resin Manufactured by Harwick Standard Chemical Company and having a specific gravity of 0.97–1.03.

Although the preferred rubbers are those which are oil resistant, such as Neoprene, butadiene-acrylonitrile polymers and cholorosulfonated polyethylene (Hypalon), other rubbers can be used in the bead-gripping rings, e.g. unsaturated hydrocarbon polymers exemplified by the diene polymers such as polybutadiene or polyisoprene; copolymer rubbers such as butadiene-styrene or butyl; natural polymers such as balata, Hevea rubber and the like. Other unsaturated hydrocarbon polymers which may be used are the rubbery interpolymers of at least two alpha-mono olefins and at least one copolymerizable diene such as are disclosed in British Pat. No. 880,904 of Dunlop Rubber Company, Oct. 25, 1961, U.S. Pat. No. 2,933,480, issued Apr. 19, 1960 to Gresham and Hunt, and 3,000,866, issued Sept. 19, 1961 to Tarney, and Belgian Pat. Nos. 623,698 and 623,741 of Montecatini, Feb. 14, 1963.

The bead-grip rings 120 are described and claimed in a copending U.S. application of Daniel Shichman, Edward P. Percarpio and Sheppard A. Black, Ser. No. 590,180 filed June 25, 1975.

Referring again to FIG. 6, a shaping bladder generally designated 118 is secured on two lateral flanges 116 by means of a pair of rings 124. The bladder 118 comprises a cylindrical center section 150 the middle of which seats on a supporting ring 151 (see FIG. 6) when a tire carcass is being built thereon, and a pair of annular, beaded end sections 152.

The cylindrical center section 150 is characterized by four identical convolutions or hollows 158, a pair being situated on either side of a central thick portion 153 whose width is approximately double the width of one of the two thick portions 154 separating each pair of the identical convolutions 158. Outwardly spaced from each thick portion 154 and adjacent the outermost convolutions 158 are second thick portions 155 identical to the thick portions 154. The convolutions 158 are, in effect, expansion hollows, which provide additional length in the axial direction of the bladder when the bladder is pressurized, as seen in FIG. 9. A first segment 156 of reinforcing material is situated adjacent the inner surface of liner 157 of the bladder 118 in the cylindrical center section 150 and extends through the interior portion of the beaded end sections 152, and follows the contour of the bladder liner 157 in the cylindrical center section 150. The first segment 156 of reinforcement determines the axial yield or extensibility of the bladder 118, which assures adequate support across the full width of the tire carcass when it is expanded to the circumference required as will be described subsequently. The liner 159 prevents air from entering into the reinforcement when the bladder is pressurized for shaping the tire carcass.

Generally, the reinforcing material 156 will "straighten out" or flatten to provide approximately ½ inch of axial dimension per convolution, so that the four convolutions 158 provide about 2 inches of additional axial dimension, and the two end portions 159 provide about one inch of additional axial dimension. Since the initial width of the tire carcass exceeds the width of the bladder, this expansion or stretching of the bladder is necessary to properly shape the tire carcass. Bands of parallel 1 × 5 × 0.006 inch steel cords 160 are situated in the thick portions, with the cords 160 having their lengths parallel to the bladder axis, and they are spaced from and exterior to the first segment 156 of reinforcing material. The cords 160 add rigidity to the bladder 118, and govern axial extensibility in the area in which they are situated to a low value, since they are less extensible than the reinforcing material 156.

A second segment 161 of reinforcing material is situated adjacent the liner comprising the inner and outer surface of the beaded end section 152 and follows the contour of said surfaces. The wedge effect created by the design of the reinforcing material 161 together with the design of the beads 152 prevent the end sections 152 from being pulled out from between the flanges 116 and the rings 124.

The convolutions 158 permit the bladder 10 to be pressurized, as seen in FIG. 9, without distortion or undue compression of the mass at the inner surface of the bladder 10, which becomes smoother. The outer surface of the bladder will show slight dips 162 at the convolutions 158 on pressurization.

At least two different compounds are keyed to specific components of the bladder. The rubber of the center cylindrical section 150 is compounded to give good mechanical adhesion, when vulcanized, to the carcass of a tire during expansion to require relatively low pressure (10-20 p.s.i.) for inflation, and to have a hardness, preferably, in the range of 30–40 on a Shore A durometer. The rubber of the beaded end sections 152 is compounded to give a harder rubber in order to reduce the tendency of the beads to pull out of the flanges 116 and rings 124 when the bladder 118 is inflated. The hardness is, preferably, between about 70 and 75 on a Shore A durometer. Since the first segment 156 of reinforcing material restricts the axial yield of the bladder 118 while permitting circumferential yield, it is preferably a fibrous material, with the fibers aligned substantially parallel to the axis of the bladder 118.

The reinforcing material in segments 156 and 161 preferably comprises an aramid fiber available under the trademarks "Fiber B" or "Kevlar". Aramid is the generic name for fibers made from the condensation product of isophthalic or terephthalic acid and m- or p-phenylene diamine. "Fiber B" and "Kevlar" are generally understood to be products of the condensation of terephthalic acid and p-phenylenediamine. Aramid is defined as a manufactured fiber in which the fiberforming substance is a long-chain synthetic aromatic polyamide in which at least 85% of the amide linkages are attached directly to two aromatic linkages. Further details of the fiber are disclosed in U.S. Pat. No. 3,393,210.

The preferred cord construction of the reinforcing material is a twist level of 1500/3, 7.2 × 7.2, wherein the fiber is coated with a natural rubber compound, 10 ends per inch, with a fabric gage of 0.080 inch.

It should be apparent, that owing to the introduction of controlled stretch at the convolutions 158, the stretch of the substantially cylindrical center section 150 between the convolutions 158 may be very small, even approaching zero. Hence, the thickness of the center section 150 may be made greater than that of conventional shaping bladders. This greater thickness provides desirable firmness when the bladder is expanded and together with a modulus higher than that of the uncured tire carcass being shaped, forces the tire carcass, while it is being expanded, to conform to the profile of the pressurized bladder.

The bladder itself requires about 10–20 p.s.i. for expansion to its shaping diameter (FIG. 9), and with a tire carcass mounted thereon, about 10–24 p.s.i., for example, 15 p.s.i. This pressure exerted on the bladder provides the carcass with a firm, solid base against which applications of the breakers and the tread takes place.

The bladder 118 is described and claimed in a copending U.S. application of Daniel Shickman and Edward P. Percarpio, Ser. No. 590,225, filed June 25, 1975 now U.S. Pat. No. 3,963,394 issued June 15, 1976.

Referring now more particularly to FIGS. 6–9, the method of making a pneumatic tire and molding the tire in a tire mold comprises forming a tire carcass of approximately cylindrical shape having at least one ply 15 of tire cord fabric extending between a pair of beads 11,12 with the cords of the fabric being substantially parallel to the axis of the cylindrical carcass. The carcass preferably has two plies 15,16 of tire cord fabric with the cords of each ply being at substantially equal but opposite angles with respect to the axis of the cylindrical carcass and with the cords of each ply being substantially parallel to the axis of the cylindrical carcass. That is, the cords of the ply 15 preferably lie in a plane in the range of zero to five degrees from a plane containing the axis of the cylindrical carcass, and the cords of the ply 16 preferably lie in a plane at the same but opposite angle in the range of zero to five degrees from a plane containing the axis of the cylindrical carcass. The cylindrical carcess may be formed in any conventional manner, for example, on the drum 112 or on an alternate flat drum by tire building apparatus such as described and claimed in U.S. Pat. No. 3,489,634- Pizzo et al.

The method also includes the step of gripping both beads of the carcass. This may be accomplished by applying pneumatic pressure for example, 40 p.s.i., to the bead grip rings to expand the rings as represented in FIGS. 7 and 8. The beads are tightly gripped and circumferential rotation of the beads during expansion of the carcass is thereby prevented.

The method also includes the step of partially expanding the carcass to a maximum diameter increased over the diameter of the cylindrical carcass by an amount not greater than 85 percent, and preferably at least thirty percent, of the difference between the maximum diameter of the carcass when fully expanded into the mold and the diameter of the cylindrical carcass. To this end, the shaping bladder 118 may be expanded as represented in FIG. 9 to provide a partial expansion of the carcass to a maximum diameter increased over the diameter of the cylindrical carcass by, for example, approximately 43 percent of the difference between the maximum diameter of the carcass when fully expanded into the mold and the diameter of the cylindrical carcass. For example, if the ply 15 on the flat drum on which the carcass is built has a diameter of 13.625 inches, and the ply 15 when fully expanded in the mold has a diameter of 25.630 inches, partial expansion of the ply 15, on the FIG. 9 apparatus to a maximum diameter of 20 inches is a partial expansion of the ply 15 of 53.1 percent of the difference between the maximum diameter of the carcass when fully expanded into the mold and the diameter of the cylindrical carcass. The shaping pressure may be, for example, 10 to 24 p.s.i.

The method includes applying at least one breaker ply of cords around the region of maximum diameter of the partially expanded carcass and preferably applying two breaker plies of cords around the region of maximum diameter of the partially expanded carcass with the cords of the two plies being at substantially equal but opposite angles with respect to the mid-circumferential line X—X of the partially expanded carcass. For the tire having breaker plies represented in FIGS. 4 and 5 after curing, the breaker plies were applied at substantially equal but opposite angles of 34° with respect to the mid-circumferential line X—X of the partially expanded carcass. The breaker plies preferably are applied at substantially equal but opposite angles in the range of 24° to 40° with respect to the midcircumferential line X—X of the partially expanded carcass. The breaker plies may be applied by hand. Cap ply breakers can be applied at about 22° or a range of 18° to 24°.

The method also includes the top step of applying a tread portion 24 of elastomeric material over the carcass and breaker plies 25,26. This also may be done by hand, as represented in FIG. 9.

The method also includes the steps of placing the assembled carcass, breaker plies, and tread portion in a press having the tire mold therein, fully expanding the assembled carcass, breaker plies and treat portion into the tire mold to form a tire, and curing the tire. A conventional Bag-O-Matic press, sold by The McNeill Machine and Engineering Company, Akron, Ohio of the general type described in U.S. Pat. No. 2,808,618 — Soderquist can be utilized to mold and cure the tire. The bead supporting rings and bag of the press hold the beads of the tire during expansion and prevent circumferential rotation of the beads. The shifting of the carcass cords and the breaker cords occurs during the expansion in the press to form the previously described tire. The shaping pressure in the press may be, for example, 24 p.s.i. prior to cure pressure being applied.

From the foregoing description, it will be apparent that capital investment in breaker and tread building and transfer equipment for the manufacture of radial tires and in modifications usually required in presses for the manufacture of radial tires is minimized.

While there have been described what are at present considered to be the preferred embodiments of this invention, it will be obvious to those skilled in the art that various changes and modifications may be made therein, without departing from the invention, and it is, therefore, aimed to cover all such changes and modifications as fall within the true spirit kand scope of the invention.

What is claimed is:

1. A pneumatic tire having tread and sidewall portions and a shoulder region comprising:
   a carcass comprising two beads and at least one ply of cords extending from bead to bead, the shortest line along said carcass from the end region of a given cord of said ply at one bead to the end region of said given cord at the other bead being a line lying in a plane in the range of 0° to 5° from a radial plane of the tire, said end regions of said given cord at both beads being substantially equally spaced from said radial plane;
   said carcass cords intersecting the shortest lines along said carcass between the end regions of said cords at said one bead to the end regions of said cords at said other bead, the intersections occurring at said end regions of said cords and at a point therebetween, said carcass cords having a slope departing gradually from the slope of said shortest lines, the maximum angular departure of said slope of said carcass cords of said one ply from said slope of said shortest lines between said end regions of said cords of said one ply being at least 10° averaged over a substantial length of said cords of said one ply;
   one or more breaker ply plies of cords extending continuously over said carcass plies from shoulder region to shoulder region of the tire and each having two circumferential edges and each having a cord angle averaged over a region extending a substantial distance on each side of the equator of the tire in the range of 12° to less than 20° with respect to said equator and having a cord angle averaged over a substantial distance at said edges of said breaker ply which is higher than said average breaker cord angle on each side of said equator;
   all breaker plies of cords of the tire having cord angles displaced from 0°;
   said tread and sidewall portions being of elastomeric material disposed over said carcass and breaker plies.

2. A pneumatic tire in accordance with claim 1 in which the maximum departure of the cords of at least said one carcass ply from said shortest lines along said carcass between said end regions of said cords at said one bead to said end regions of said cords at said other bead lies in the range of 10° to 30° averaged over a substantial length of said cords of said one carcass ply.

3. A pneumatic tire in accordance with claim 1 in which said maximum departure of said cords of said one carcass ply from said shortest lines between said cords of said one carcass ply is approximately 17° averaged over a substantial length of said cords of said one ply.

4. A pneumatic tire in accordance with claim 1 in which said average breaker cord angle at said edges of said breaker ply is in the range of 16 to 32° with respect t said equator.

5. A pneumatic tire in accordance with claim 1 which includes inner and outer breaker plies of cords extending continuously over said carcass plies from shoulder region to shoulder region of the tire and each breaker ply having two circumferential edges and in which said outer breaker ply has a cord angle averaged over a region extending a substantial distance on each side of said equator in the range of 12° to less than 20° with respect to said equator and having a cord angle averaged over a distance at said outer breaker ply in the range of 16° to 32° with respect to aid equator with said average breaker cord angle at said edges of said outer breaker ply being higher than said average outer breaker cord angle on each side of said equator.

6. A pneumatic tire in accordance with claim 5 in which said outer breaker ply has said cord angle of approximately 16° averaged over a region extending a substantial distance on each side of said equator.

7. A pneumatic tire in accordance with claim 6 in which said average breaker cord angle at said edges of said outer breaker ply is in the range of 16° to 32°.

8. A pneumatic tire in accordance with claim 1 which also includes a cap ply breaker over said breaker ply.

9. A pneumatic tire having tread and sidewall portions and a shoulder region comprising:

a carcass comprising two beads and at least two plies of cords extending from bead to bead with the cords of one of said plies crossing the cords of the other of said plies, the shortest line along said carcass from the end region of a given cord of said one ply at one bead to the end region of said given cord at the other bead being a line lying in a first plane in the range of 0° to 5° from a radial plane of the tire, the shortest line along said carcass from the end region of a given cord of said other ply at said one bead to the end region of said given cord of said other ply at said other bead lying in a second plane in the range of 2° to 5° from said radial plane of the tire, said end regions of said given cord at both beads being substantially equally spaced from said radial plane;

said carcass cords intersecting the shortest lines along said carcass between the end regions of said cords at said one bead to the end regions of said cords at said other bead, the intersections occurring at said end regions of said cords and at a point therebetween, said carcass cords having a slope departing gradually from the slope of said shortest lines, the maximum angular departure of said slope of said carcass cords of at least one of said plies from said slope of said shortest lines between said end regions of said cords thereof being at least 10° averaged over a substantial length of said cords of said one ply;

one or more breaker plies of cords extending continuously over said carcass plies from shoulder region to shoulder region of the tire and each having two circumferential edges and each having a cord angle averaged over a region extending a substantial distance on each side of the equator of the tire in the range of 12° to less than 20° with respect to said equator and having a cord angle averaged over a substantial distance at said edges of said breaker ply which is higher than said average breaker cord angle on said side of said equator;

all breaker plies of cords of the tire having cord angles displaced from 0°;

said tread and sidewall portions being of elastomeric material disposed over said carcass and breaker plies.

10. A pneumatic tire in accordance with claim 9 in which said shortest line along said carcass from said end region of said given cord of said other ply at said one bead to said end region of said given cord of said other ply at said other bead is a line lying in said second plane substantially five degrees from said radial plane of the tire.

11. A pneumatic tire in accordance with claim 9 in which the maximum departure of the cords of at least said one ply from the shortest lines along said carcass between the end regions of said cords of said one ply lies in the range of 10° to 30° averaged over a substantial length of said cords of said one ply.

12. A pneumatic tire in accordance with claim 9 in which said maximum departure of said cords of at least said one ply from said shortest lines between said cords of said one ply is approximately 17° averaged over a substantial length of said cords of said one ply.

13. A pneumatic tire in accordance with claim 9 in which said average breaker cord angle at said edges of said breaker ply is in the range of 16° to 32° with respect to said equator.

* * * * *

UNITED STATES PATENT AND TRADEMARK OFFICE
CERTIFICATE OF CORRECTION

PATENT NO. : 4,120,339
DATED : October 17, 1978
INVENTOR(S) : Daniel Shichman

It is certified that error appears in the above-identified patent and that said Letters Patent are hereby corrected as shown below:

Column 10, line 19 for "breaker ply plies" read --breaker plies--.

Column 10, line 50 for "t said" read --to said--.

Column 10, line 61 for "aid equator" read --said equator--.

Signed and Sealed this

Thirtieth Day of January 1979

[SEAL]

Attest:

RUTH C. MASON
Attesting Officer

DONALD W. BANNER
Commissioner of Patents and Trademarks